United States Patent
Chikura et al.

(10) Patent No.: US 9,061,247 B2
(45) Date of Patent: Jun. 23, 2015

(54) SEPARATION MEMBRANE MODULE

(75) Inventors: Shinichi Chikura, Osaka (JP);
Toshimitsu Hamada, Osaka (JP);
Yasuhiro Uda, Osako (JP); Hideyuki Yamane, Osaka (JP); Kazuhito Yoshida, Osaka (JP); Masashi Beppu, Osaka (JP);
Masakatsu Takata, Osaka (JP)

(73) Assignee: Nitto Denko Corporation, Osaka (JP)

( * ) Notice: Subject to any disclaimer, the term of this patent is extended or adjusted under 35 U.S.C. 154(b) by 187 days.

(21) Appl. No.: 13/877,030

(22) PCT Filed: Sep. 13, 2011

(86) PCT No.: PCT/JP2011/005140
§ 371 (c)(1),
(2), (4) Date: Mar. 29, 2013

(87) PCT Pub. No.: WO2012/046388
PCT Pub. Date: Apr. 12, 2012

(65) Prior Publication Data
US 2013/0186819 A1 Jul. 25, 2013

(30) Foreign Application Priority Data
Oct. 4, 2010 (JP) ................................. 2010-224860

(51) Int. Cl.
*B01D 65/00* (2006.01)
*B01D 63/12* (2006.01)
*B01D 63/10* (2006.01)

(52) U.S. Cl.
CPC ............ *B01D 65/003* (2013.01); *B01D 63/106* (2013.01); *B01D 63/12* (2013.01); *B01D 2313/04* (2013.01); *B01D 2313/083* (2013.01)

(58) Field of Classification Search
CPC .. B01D 2313/04; B01D 63/106; B01D 63/12; B01D 65/003; B01D 2313/083
See application file for complete search history.

(56) References Cited

U.S. PATENT DOCUMENTS

| | | | |
|---|---|---|---|
| 6,224,767 B1 | 5/2001 | Fujiwara et al. | |
| 8,568,589 B2 * | 10/2013 | Uda et al. ........................ | 210/335 |
| 2010/0326901 A1 | 12/2010 | Chikura et al. | |

FOREIGN PATENT DOCUMENTS

| | | |
|---|---|---|
| CN | 2295097 Y | 10/1998 |
| CN | 1232718 A | 10/1999 |
| JP | 5-093530 | 12/1993 |
| JP | 11-267470 | 10/1999 |
| JP | 2006-212514 | 8/2006 |
| JP | 2009-220104 | 10/2009 |

* cited by examiner

*Primary Examiner* — John Kim
(74) *Attorney, Agent, or Firm* — Hamre, Schumann, Mueller & Larson, P.C.

(57) ABSTRACT

A separation membrane module (1A) includes: a tubular pressure container (7); a plurality of separation membrane elements (2) inserted in the pressure container (7) and each having a first end member (3) and a second end member (4); and a sealing member (5A) mounted on one of or both the first end member (3) and the second end member (4) that are adjacent to each other. In a normal condition, the sealing member (5A) is located radially inward of a maximum diameter portion of the first end member (3) and/or the second end member (4) on which the sealing member (5A) is mounted. The sealing member (5A) is deformed due to contact between the adjacent separation membrane elements (2) or due to supply of a pressurized liquid into the pressure container (7), and comes into close contact with an inner circumferential face (7a) of the pressure container (7).

10 Claims, 13 Drawing Sheets

PRIOR ART ical field of the present invention.

SEPARATION MEMBRANE MODULE

TECHNICAL FIELD

The present invention relates to a separation membrane module in which a plurality of separation membrane elements are inserted in a tubular pressure container.

BACKGROUND ART

For example, separation membrane modules used for seawater desalination, ultrapure water production etc., are conventionally known. For example, Patent Literature 1 discloses a separation membrane module 10 as shown in FIG. 12 and FIG. 13. The separation membrane module 10 includes a tubular pressure container 11 and a plurality of separation membrane elements 12 inserted in the pressure container 11 in a line. As shown by an arrow in FIG. 12, when raw water is supplied into the pressure container 11 from one end of the separation membrane module 10, the raw water is separated into permeated water and concentrated water by separation membranes of the separation membrane elements 12, and the permeated water and the concentrated water are separately discharged from the other end of the separation membrane module 10.

Each separation membrane element 12 has a layered body including a separation membrane and wound around a central pipe, and has a pair of end members 13 disposed in such a way as to sandwich the layered body. In the separation membrane module 10 shown in FIG. 12 and FIG. 13, a packing 15 having an approximately U-shaped cross-section is mounted on the end member 13 located on the upstream side, and the packing 15 seals a gap between the separation membrane element 12 and the inner circumferential face of the pressure container 11 by means of a pressure of the raw water applied from the upstream side.

The packing 15 has an outer diameter which is nearly equal to the diameter of the inner circumferential face of the pressure container 1, even in a natural posture where no pressure from the upstream side is exerted. Therefore, when the separation membrane element 12 is inserted into the pressure container 11, the separation membrane element 12 is conventionally pushed into the pressure container 11 in such a manner that the packing 15 pressed by the weight of the separation membrane element 12 is rubbed against the inner circumferential face of the pressure container 11.

CITATION LIST

Patent Literature

Patent Literature 1: JP 2009-220104 A

SUMMARY OF INVENTION

Technical Problem

Conventional separation membrane elements generally have an outer diameter of 8 inches. In the recent years, however, large-size separation membrane elements having an outer diameter of 16 to 24 inches have been developed. However, in such a large-size separation membrane element, the area of contact between the inner circumferential face of the pressure container and the packing is increased, and the weight of the separation membrane element is also increased. Therefore, with a conventional structure of a separation membrane module, it is difficult to insert a separation membrane element into a pressure container.

In view of such circumstances, the present invention aims to provide a separation membrane module that allows easy insertion of a separation membrane element into a pressure container.

Solution to Problem

In order to solve the above problem, the present invention provides a separation membrane module including: a tubular pressure container; a plurality of separation membrane elements each having a separation membrane, and a first end member and a second end member that are disposed so as to sandwich the separation membrane, the plurality of separation membrane elements being inserted in the pressure container in such a manner that the first end members and the second end members are alternately arranged in an axial direction of the pressure container; and a sealing member being annular and mounted on one of or both the first end member and the second end member that are adjacent to each other, the sealing member in a normal condition being located radially inward of a maximum diameter portion of the first end member and/or the second end member on which the sealing member is mounted. The sealing member is deformed due to contact between the separation membrane elements adjacent to each other or due to supply of a pressurized liquid into the pressure container, and comes into close contact with an inner circumferential face of the pressure container.

The "normal condition" means a state where the sealing member is merely mounted on the first end member and/or the second end member (hereinafter, may be simply referred to as "the end member"), and maintains a natural shape free from any external force, that is, a state where the sealing member mounted on the end member has no deformation caused by an external force.

Advantageous Effects of Invention

With the above configuration, the sealing member in the normal condition is located radially inward of the maximum diameter portion of the end member, and therefore, each separation membrane element can easily be inserted into the pressure container by sliding the end member on the inner circumferential face of the pressure container. The sealing member is deformed to seal a gap between the separation membrane element and the inner circumferential face of the pressure container when another separation membrane element is subsequently placed at a proper position or when raw water is supplied into the pressure container after all of the separation membrane elements are placed at proper positions.

DESCRIPTION OF EMBODIMENTS

Hereinafter, embodiments of the present invention will be described with reference to the drawings. The following description relates to some examples of the present invention, and the present invention is not limited by these examples.

First Embodiment

Figure 1:
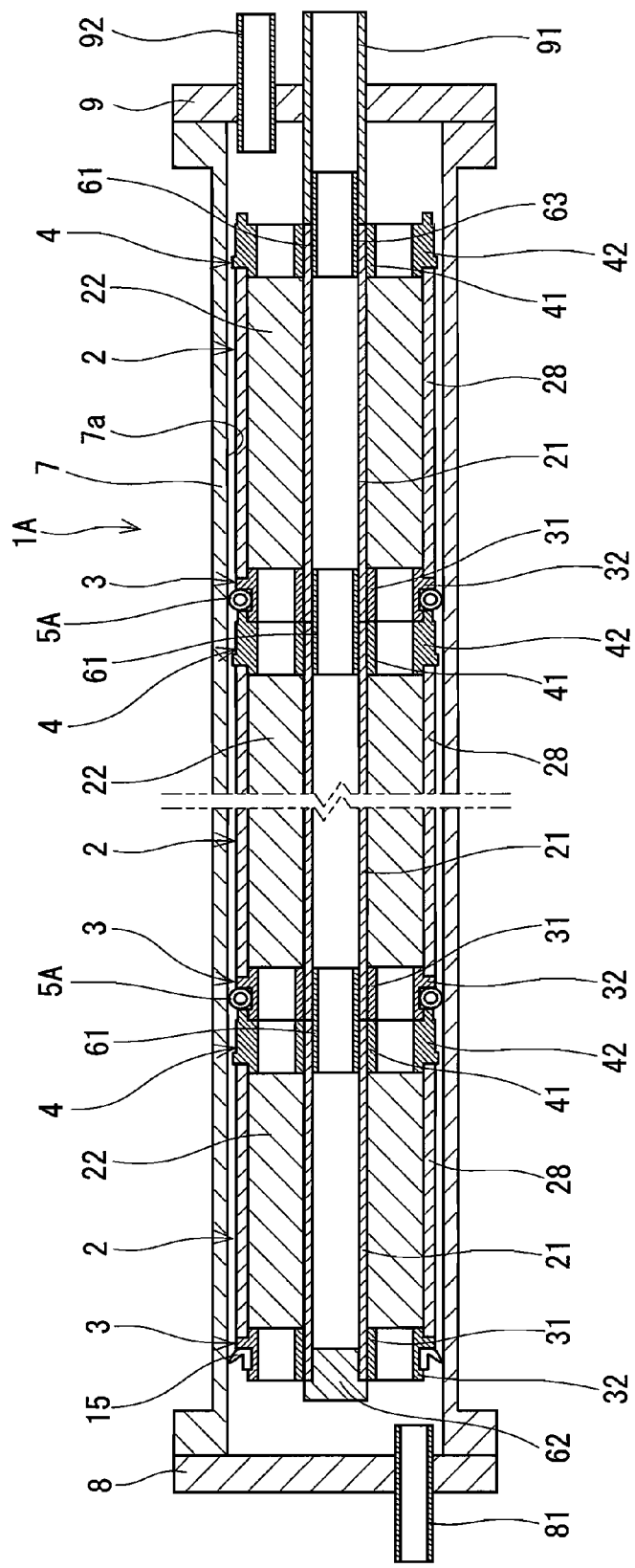
FIG. 1 is a cross-sectional view of a separation membrane module according to a first embodiment of the present invention.

A separation membrane module 1A according to a first embodiment of the present invention is shown in FIG. 1. The separation membrane module 1A includes a tubular pressure container 7 called a vessel, and a plurality of separation membrane elements 2 inserted in the pressure container 7.

Disc-shaped caps 8 and 9 are attached to both ends of the pressure container 7. In the cap 8 on one side (left side in FIG. 1), a supply pipe 81 for supplying raw water into the pressure container 7 is provided at a position apart from the center. In the cap 9 on the other side (right side in FIG. 1), a first discharge pipe 91 for drawing permeated water is provided at the center, and a second discharge pipe 92 for drawing concentrated water is provided at a position apart from the center. That is, a flow of raw water from the cap 8 on the one side to the cap 9 on the other side is formed in the pressure container 7. The supply pipe 81 and the second discharge pipe 92 may be provided in the pressure container 7.

In the present embodiment, a spiral reverse osmosis membrane element is used as the separation membrane element 2. However, the separation membrane element 2 may be, for example, a spiral ultrafiltration membrane element or a cylindrical element of another type.

Each separation membrane element 2 includes: a central pipe 21 functioning as a water collecting pipe; a layered body 22 wound around the central pipe 21; a first end member 3 and a second end member 4 that are disposed so as to sandwich the layered body 22; and an outer covering material 28 enclosing the layered body 22. The first end member 3 and the second end member 4 also function to prevent the layered body 22 from extending telescopically.

In the present embodiment, each separation membrane element 2 is inserted in the pressure container 7 in such an orientation that the first end member 3 is located on the upstream side, and the second end member 4 is located on the downstream side. In other words, the first end members 3 and the second end members 4 are alternately arranged in the axial direction of the pressure container 7.

In addition, in the present embodiment, any two adjacent separation membrane elements 2 are coupled by a coupler 61 fitted in the central pipes 21 of both of the separation membrane elements 2, in such a manner that the first end member 3 of one separation membrane element 2 and the second end member 4 of the other separation membrane element 2 are in close contact with each other, in other words, in such a manner that the adjacent separation membrane elements 2 are in direct contact with each other. In addition, in the separation membrane element 2 located on the most upstream side, a plug 62 is attached to one end of the central pipe 21 that is opposite from the coupler 61. A low of raw water into the central pipe 21 is thus blocked. Furthermore, the central pipe 21 of the separation membrane element 2 located on the most downstream side is coupled to the first discharge pipe 91 by a second coupler 63.

Figure 2:
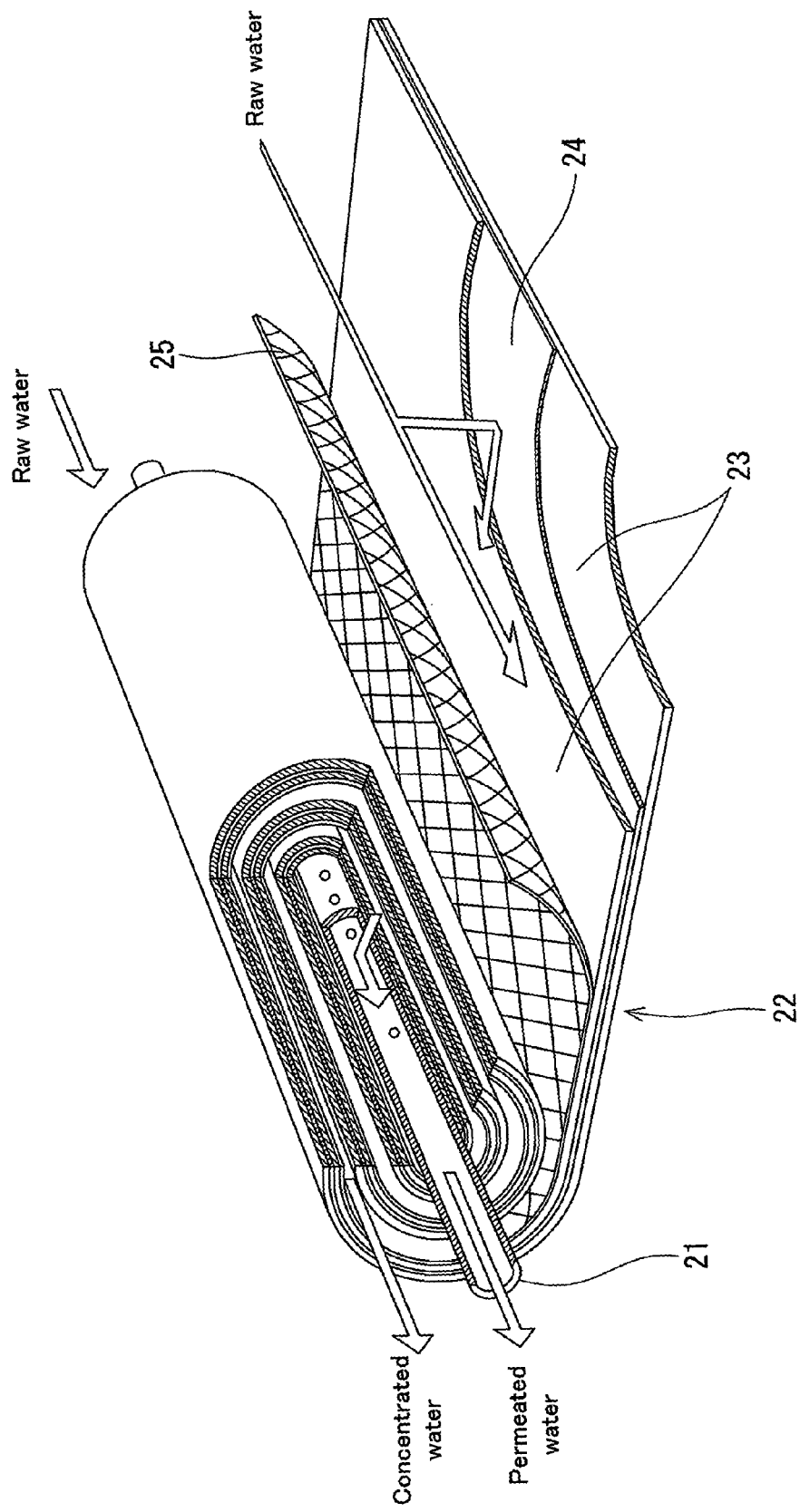
FIG. 2 is a configuration diagram of a spiral separation membrane element which is an example of separation membrane elements.

As shown in FIG. 2, the central pipe 21 of each separation membrane element 2 is provided with a plurality of introduction holes for flowing permeated water into the central pipe 21.

The layered body 22 has a rectangular shape, and is wound in a direction from one side of the rectangle to the opposite side. The layered body 22 includes: a membrane member composed of a permeated water flow path material 24 and separation membranes 23 placed over both faces of the permeated water flow path material 24; and a raw water flow path material 25. The separation membranes 23 are joined to each other at their three sides so that the membrane member has the shape of a sack that is open in one direction. The opening communicates with the introduction holes of the central pipe 21. The permeated water flow path material 24 is, for example, a net made of a resin, and forms a flow path for flowing permeated water between the separation membranes joined to each other. The raw water flow path material 25 is, for example, a net made of a resin (a net that has larger meshes than the permeated water flow path material 24), and forms a flow path for flowing raw water between wound layers of the membrane member.

Examples of the material of the separation membranes 23 include aromatic polyamide-based materials excellent in pressure reducing performance, polyvinyl alcohol-based materials excellent in permeability, and sulfonated polyethersulfone-based materials suitable for nanofiltration membranes.

Referring back to FIG. 1, the first end member 3 has an inner tubular portion 31 externally fitted to one end of the central pipe 21, and has an outer tubular portion 32 being concentric with the inner tubular portion 31 and surrounding the inner tubular portion 31 at a distance from the inner tubular portion 31. The inner tubular portion 31 and the outer tubular portion 32 are coupled by an annular plate in which a plurality of ribs or through holes are formed (not shown in the drawings). Thus, flow-through openings which penetrate the first end member 3 and through which raw water flows are formed between the inner tubular portion 31 and the outer tubular portion 32.

Similar to the first end member 3, the second end member 4 has an inner tubular portion 41 externally fitted to the other end of the central pipe 21, and has an outer tubular portion 42 being concentric with the inner tubular portion 41 and surrounding the inner tubular portion 41 at a distance from the inner tubular portion 41. The inner tubular portion 41 and the outer tubular portion 42 are coupled by an annular plate in which a plurality of ribs or through holes are formed (not shown in the drawings.) Thus, flow-through openings which penetrate the second end member 4 and through which raw water flows are formed between the inner tubular portion 41 and the outer tubular portion 42.

An annular sealing member 5A is mounted on any of the first end members 3 that are adjacent to the second end members 4 (i.e., the first end members 3 of the separation membrane elements 2 other than the separation membrane element 2 that is located on the most upstream side). The conventional packing 15 having an approximately U-shaped cross-section is mounted on the first end member 3 of the separation membrane element 2 located on the most upstream side. In the present embodiment, the first end member 3 of the separation membrane element 2 located on the most upstream side is formed in the same shape as the other first end members 3.

On the other hand, a pressing portion 40 (see FIGS. 3A and 3B) that presses the sealing member 5A is provided in any of the second end members 4 that are adjacent to the first end members 3 (i.e., the second end members 4 of the separation membrane elements 2 other than the separation membrane element 2 that is located on the most downstream side). In the present embodiment, the second end member 4 of the separation membrane element 2 located on the most downstream side is formed in the same shape as the other second end members 4. However, the second end member 4 of the separation membrane element 2 located on the most downstream side may have a shape with no pressing portion 40 (e.g., the same shape as that of the first end member 3).

Figure 3A:
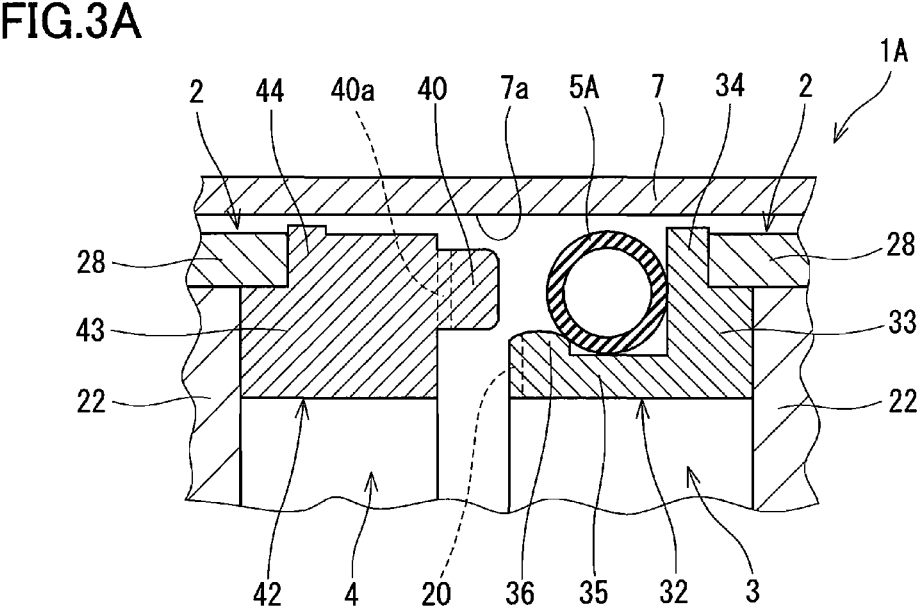
FIG. 3A is an enlarged cross-sectional view showing a state before separation membrane elements are coupled together.
Figure 3B:
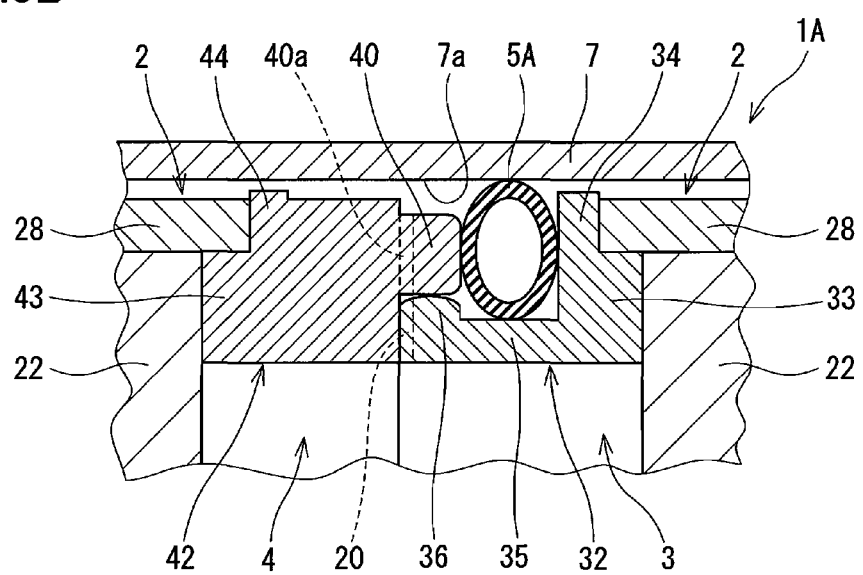
FIG. 3B is an enlarged cross-sectional view showing a state after separation membrane elements are coupled together.

Next, the configuration around the sealing member 5A will be described in detail with reference to FIGS. 3A and 3B.

The outer tubular portion 32 of the first end member 3 has a guide portion 33 fitted to the inside of the outer covering material 28, and a flange portion 34 that blocks the movement of the outer covering material 28 in the axial direction. The flange portion 34 extends radially outward beyond the outer covering material 28, and the maximum diameter of the first end member 3 is defined by the outer circumferential face of the flange portion 34. In addition, the flange portion 34 has an outer end face that faces the opposite side to the outer covering material 28 (i.e., an outer end face perpendicular to the axial direction of the pressure container 7), and the sealing member 5A is supported by the outer end face from the opposite side to the second end member 4.

In addition, the outer tubular portion 32 has a reduced diameter portion 35 that supports the sealing member 5A from inside, and a projecting portion 36 that projects radially outward from an edge of the reduced diameter portion 35 and that prevents the sealing member 5A from being disengaged from the reduced diameter portion 35. In other words, the flange portion 34, the reduced diameter portion 35, and the projecting portion 36 form a groove extending in the circumferential direction and intended for mounting of the sealing member 5A.

In a state (normal condition) where the sealing member 5A is merely mounted on the first end member 3, and maintains a natural shape free from any external force, the sealing member 5A has such an outer diameter that the sealing member 5A is located radially inward of the maximum diameter portion of the first end member 3. That is, the outer diameter of the sealing member 5A in the natural posture is slightly smaller than the maximum diameter of the first end member 3. The sealing member 5A is deformed due to contact between the adjacent separation membrane elements 2, and comes into close contact with the inner circumferential face 7a of the pressure container 7.

A hollow elastic body is shown as an example of the sealing member 5A used in the present embodiment. However, the sealing member 5A does not need to be hollow. The cross-sectional shape of the sealing member 5A is preferably circular, but may be polygonal. Examples of materials usable for forming the sealing member 5A include: synthetic rubbers such as nitrile rubbers (NBR), ethylene propylene rubbers (EPDM), silicone rubbers, fluorine rubbers, and butyl rubbers (IIR); and natural rubbers. In addition, the hardness of the sealing member 5A is preferably in the range of 30 to 80, and is more preferably in the range of 40 to 60, in terms of shore hardness. If the hardness is too high, the sealing member 5A is likely to be broken by pressing. If the hardness is too low, the sealing member 5A cannot withstand the pressure of a fluid, and cannot perform sufficient sealing function.

On the other hand, the outer tubular portion 42 of the second end member 4 has a guide portion 43 fitted to the inside of the outer covering material 28, and a flange portion 44 that blocks the movement of the outer covering material 28 in the axial direction. The flange portion 44 extends radially outward beyond the outer covering material 28, and the maximum diameter of the second end member 4 is defined by the outer circumferential face of the flange 44. The maximum diameter of the second end member 4 may be equal to or different from the maximum diameter of the first end member 3.

A projecting portion that is tubular is formed integrally in the outer tubular portion 42, and the projecting portion projects from an end face facing the first end member 3 at a position corresponding to the sealing member 5A mounted on the first end member 3. The above-described pressing portion 40 is the projecting portion. The pressing portion 40 has an front end face that is flat and parallel to the end face of the outer tubular portion 42. That is, as shown in FIG. 3B, when the adjacent separation membrane elements 2 are coupled together and brought into contact with each other, the pressing portion 40 presses the sealing member 5A in the axial direction of the pressure container 7 to deform the sealing member 5A into a shape compressed in the axial direction, and thus to press the sealing member 5A against the inner circumferential face 7a of the pressure container 7.

Furthermore, in the present embodiment, a flow path 20 for guiding raw water having passed through the separation membrane element 2 to a space around the separation membrane element 2 is formed between the first end member 3 and the second end member 4. For example, the flow path 20 can be a groove formed in an end face of the outer tubular portion 32 of the first end member 3 that faces the second end member 4.

Figure 4A:
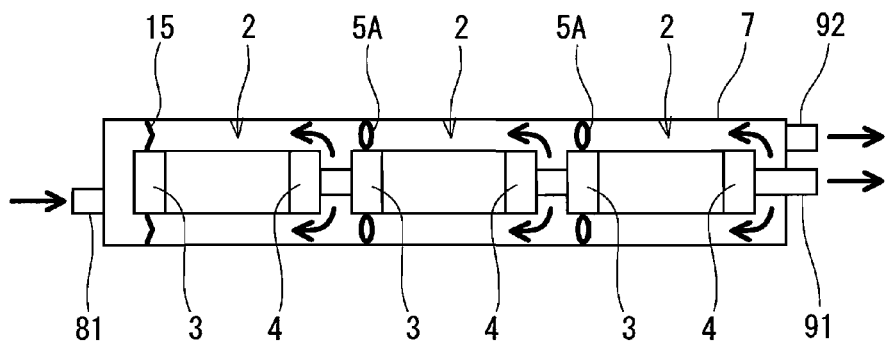
FIG. 4A is a schematic diagram showing a flow of raw water in a downstream pressure application-type separation membrane module.

In addition, a through hole penetrating the pressing portion 40 in the radial direction is formed in the pressing portion 40, and the through hole forms a communication path 40a that allows the flow path 20 to communicate with a space between the separation membrane element 2 and the inner circumferential face 7a of the pressure container 7. Therefore, as shown in FIG. 4A, the separation membrane module 1A is configured as a downstream pressure application-type separation membrane module in which the pressure of raw water having passed through each separation membrane element 2 is exerted on the outer face of the outer covering material 28 of the separation membrane element 2. Accordingly, for example, at the time of start of operation when the pressure of raw water is sharply increased, it is possible to prevent a large pressure difference between the inside and outside of the separation membrane element 2, and thus to prevent breakage of the separation membrane element 2. The pressing portion 40 may be divided into a plurality of arc-shaped pieces, and the communication path 40a may be gaps formed between the pieces.

In the separation membrane module 1A of the present embodiment described above, the sealing member 5A in the normal condition is located radially inward of the maximum diameter portion of the first end member 3. Therefore, each separation membrane element 2 can easily be inserted into the pressure container 7 by sliding the first end member 3 on the inner circumferential face 7a of the pressure container 7. The sealing member 5A is deformed to seal the gap between the separation membrane element 2 and the inner circumferential face 7a of the pressure container 7 when another separation membrane element 2 is subsequently placed at a proper position.

Modification Example

Figure 4B:
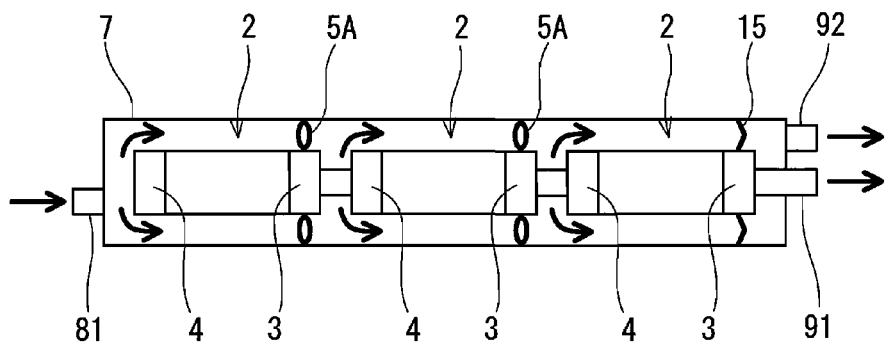
FIG. 4B is a schematic diagram showing a flow of raw water in an upstream pressure application-type separation membrane module.

The separation membrane element 2 may be inserted in the pressure container 7 in the reverse manner of the above-described embodiment, i.e., in such an orientation that the first end member 3 is located on the downstream side, and the second end member 4 is located on the upstream side. In this case, as shown in FIG. 4B, it is possible to provide an upstream pressure application-type separation membrane module in which the pressure of raw water that has not passed through each separation membrane element 2 yet is exerted on the outer face of the outer covering material 28 of the separation membrane element 2. In that case, as shown in FIG. 4B, it is sufficient that the conventional packing 15 should be mounted on the first end member 3 of the separation membrane element 2 that is located on the most downstream side.

In addition, in the case where the pressure of raw water is gradually increased or where an operation pressure applied to raw water is small, the flow path 20 does not need to be formed between the first end member 3 and the second end member 4, and the communication path 40a does not need to be provided in the pressing portion 40.

Figure 12:
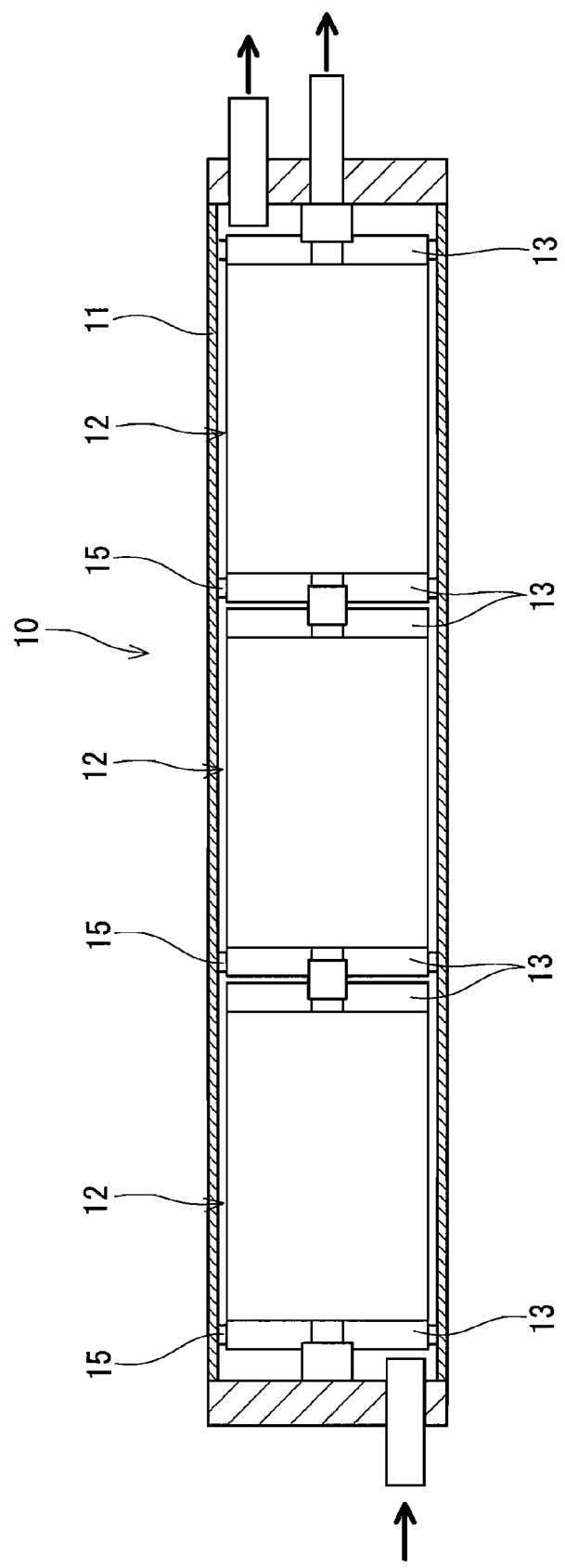
FIG. 12 is a cross-sectional view of a conventional separation membrane module.
Figure 13:
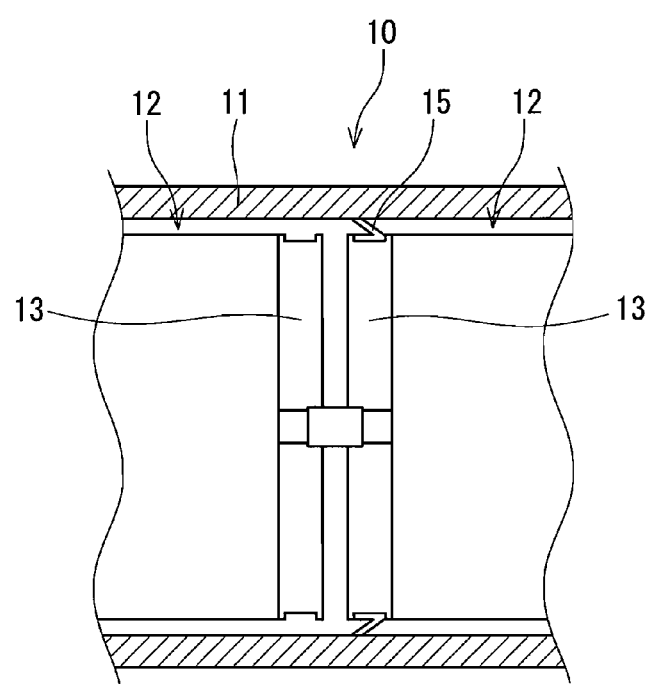
FIG. 13 is an enlarged view of main portions shown in FIG. 12.

In the above embodiment, the adjacent separation membrane elements 2 are coupled in such a manner that the first end member 3 and the second end member 4 are in close contact with each other. However, similar to the case of the conventional separation membrane module 10 shown in FIG. 12, the adjacent separation membrane elements 2 may be coupled by a coupler externally fitted to the central pipe 21 in such a manner that the first end member 3 and the second end member 4 are spaced from each other. That is, the adjacent separation membrane elements 2 may not necessarily come into direct contact with each other, and may be connected by a coupler. In this case, the flow path 20 for guiding raw water having passed through the separation membrane element 2 to a space around the separation membrane element 2 is a gap formed between the first end member 3 and the second end member 4.

Figure 5A:
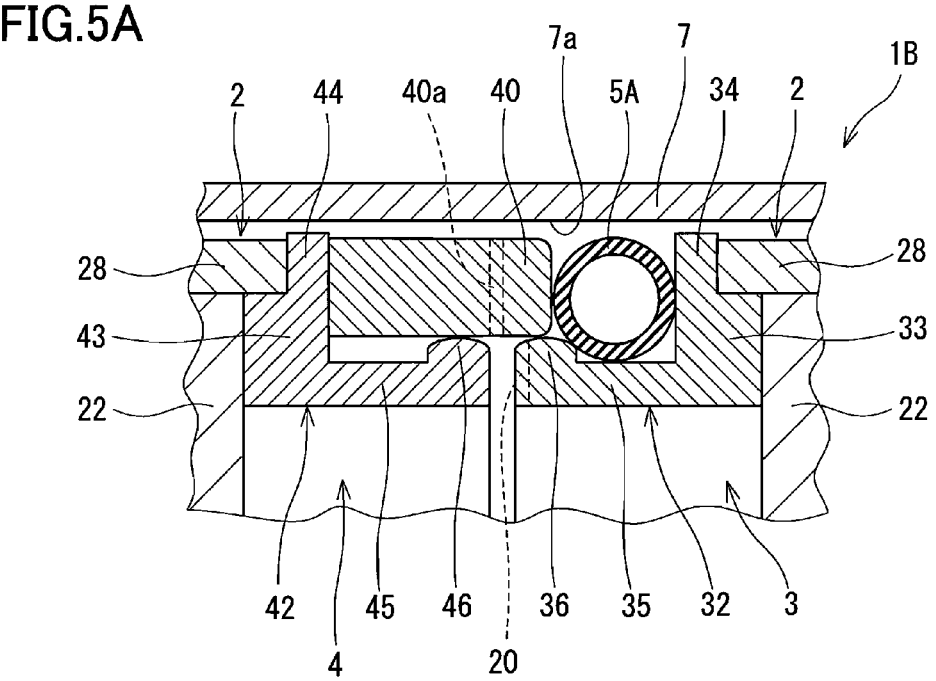
FIG. 5A is a diagram showing a separation membrane module of a modification example of the first embodiment, and is an enlarged cross-sectional view showing a state before separation membrane elements are coupled together.
Figure 5B:
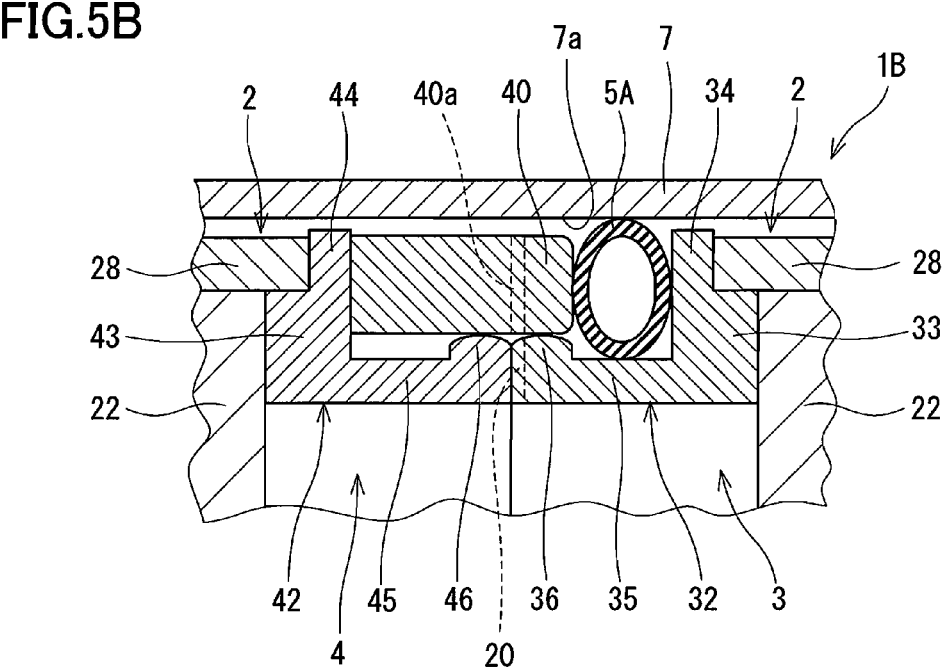
FIG. 5B is a diagram showing the separation membrane module of the modification example of the first embodiment, and is an enlarged cross-sectional view showing a state after separation membrane elements are coupled together.

Furthermore, although the pressing portion 40 is a projecting portion formed integrally in the second end member 4 in the above-described embodiment, the pressing portion 40 provided in the second end member 4 may be a discrete member supported by the second end member 4 as in a separation membrane module 1B shown as a modification example in FIGS. 5A and 5B.

Specifically, in the separation membrane module 1B, the outer tubular portion 42 of the second end member 4 includes a flange portion 44, a reduced diameter portion 45, and a projecting portion 46 which respectively have the same shapes as those of the flange portion 34, the reduced diameter portion 35, and the projecting portion 36 of the outer tubular portion 32 of the first end member 3. The pressing portion 40 is a tubular member held by the projecting portion 46 from inside, and is supported by an outer end face of the flange portion 44 from the opposite side to the first end member 3, the outer end face facing the opposite side to the outer covering material 28 (i.e., the outer end face being perpendicular to the axial direction of the pressure container 7).

With such a configuration, the first end member 3 and the second end member 4 can be formed in symmetrical shapes, or can be formed as the same components. This allows reduction of production cost.

Second Embodiment

Figure 6A:
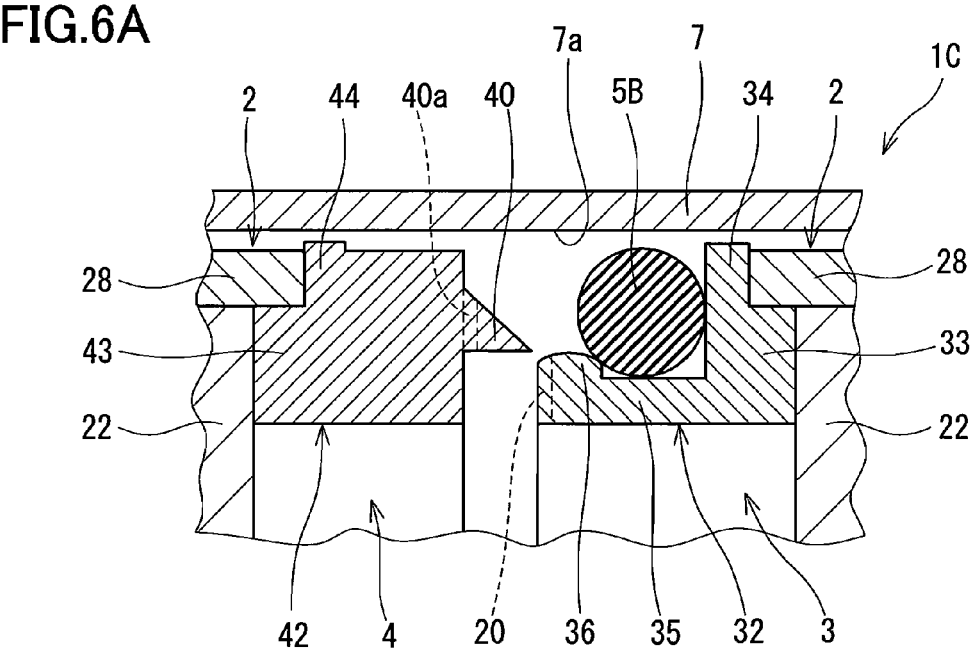
FIG. 6A is a diagram showing a separation membrane module according to a second embodiment of the present invention, and is an enlarged cross-sectional view showing a state before separation membrane elements are coupled together.
Figure 6B:
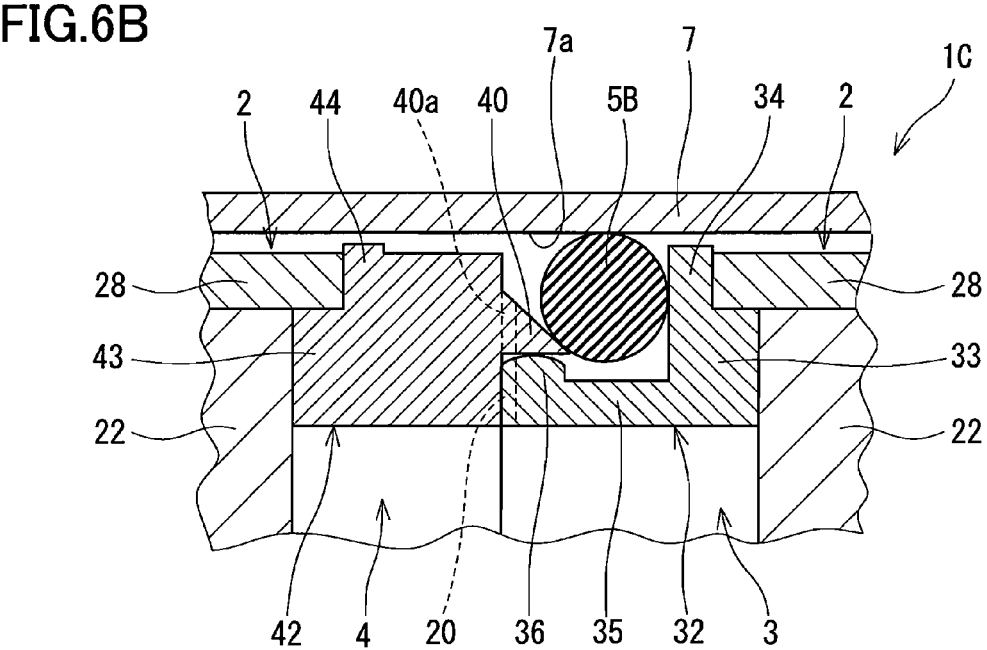
FIG. 6B is a diagram showing the separation membrane module according to the second embodiment of the present invention, and is an enlarged cross-sectional view showing a state after separation membrane elements are coupled together.

Next, a separation membrane module 1C according to a second embodiment of the present invention will be described with reference to FIGS. 6A and 6B. In the present embodiment, the same components as those described above are denoted by the same reference numerals, and the description thereof is omitted. The same applies to the other embodiments described later.

A solid elastic body is shown as an example of a sealing member 5B used in the present embodiment. However, a hollow elastic body may also be used. The cross-sectional shape of the sealing member 5A is preferably circular, but may be polygonal. The usable materials and preferable hardness for the sealing member 5B are the same as in the first embodiment.

Similar to the sealing member 5A of the first embodiment, in a state (normal condition) where the sealing member 5B is merely mounted on the first end member 3, and maintains a natural shape free from any external force, the sealing member 5B has such an outer diameter that the sealing member 5B is located radially inward of the maximum diameter portion of the first end member 3. That is, the outer diameter of the sealing member 5B in the natural posture is slightly smaller than the maximum diameter of the first end member 3. The sealing member 5B is deformed due to contact between the adjacent separation membrane elements 2, and comes into close contact with the inner circumferential face 7a of the pressure container 7.

As in the first embodiment, a tubular projecting portion is formed integrally in the outer tubular portion 42 of the second end member 4, and the projecting portion projects from an end face facing the first end member 3 at a position corresponding to the sealing member 5B mounted on the first end member 3. The pressing portion 40 is the projecting portion. In the present embodiment, the outer circumferential face of the pressing portion 40 is such a tapered face that the diameter decreases with distance from the end face of the outer tubular portion 42. That is, as show in FIG. 6B, when the adjacent separation membrane elements 2 are coupled together and brought into contact with each other, the pressing portion 40 presses the sealing member 5B outward in the radial direction to deform the sealing member 5B so that the sealing member 5B is radially expanded, and thus to press the sealing member 5B against the inner circumferential face 7a of the pressure container 7.

In addition, as in the first embodiment, the pressing portion 40 is provided with the communication path 40a that allows the space between the separation membrane element and the inner circumferential face 7a of the pressure container 7 to communicate with the flow path 20 formed between the first end member 3 and the second end member 4 to guide raw water having passed through the separation membrane element 2 to a space around the separation membrane element 2.

Also with the separation membrane module 1C of the present embodiment, the same effects as those of the separation membrane module 1A of the first embodiment can be obtained.

Modification Example

Figure 7A:
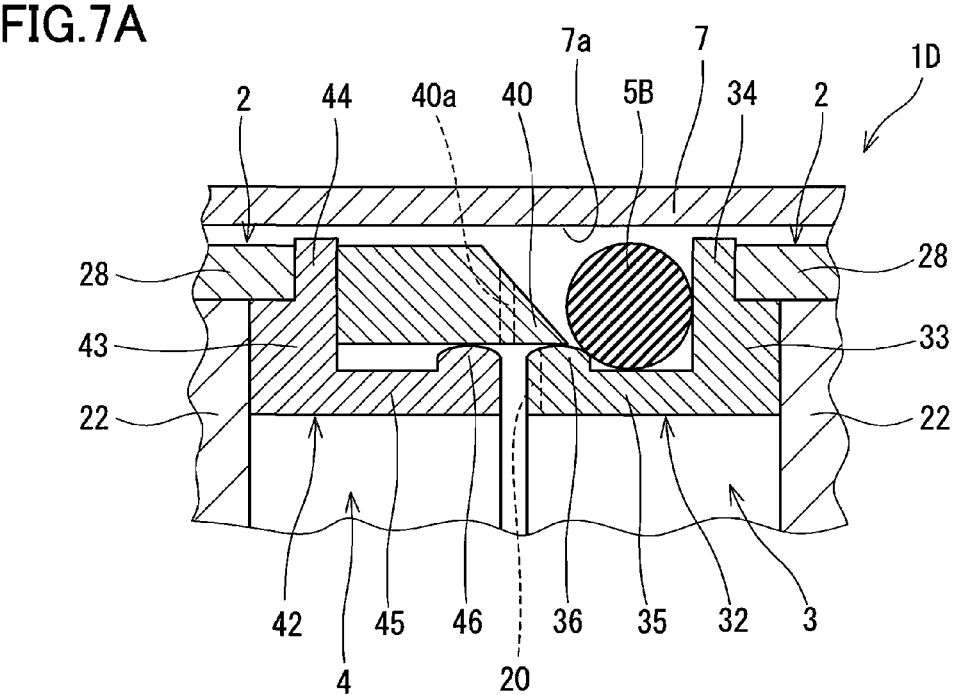
FIG. 7A is a diagram showing a separation membrane module of a modification example of the second embodiment, and is an enlarged cross-sectional view showing a state before separation membrane elements are coupled together.
Figure 7B:
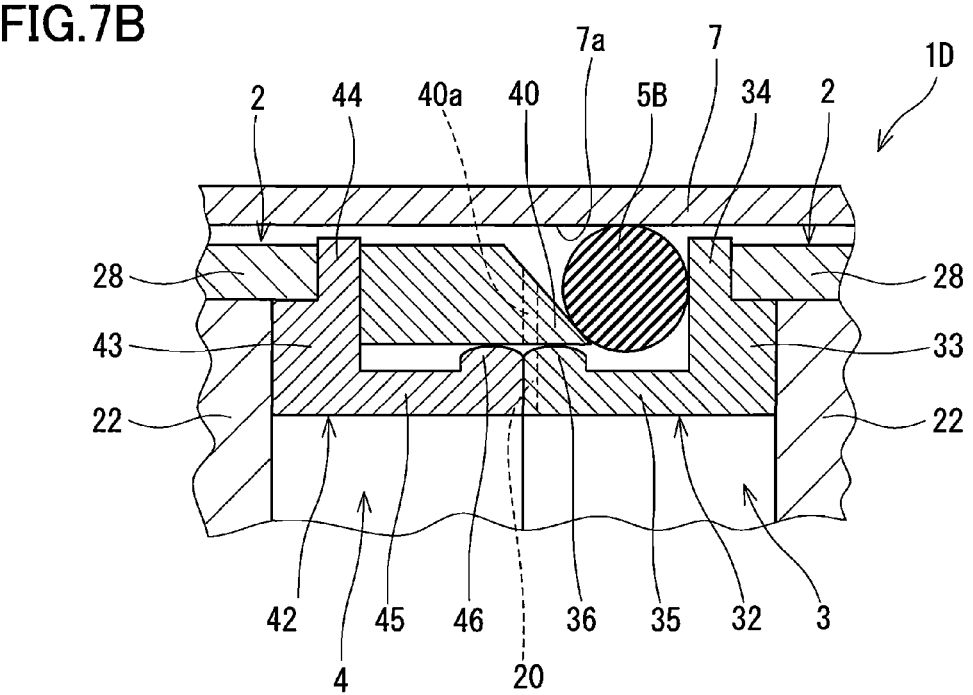
FIG. 7B is a diagram showing the separation membrane module of the modification example of the second embodiment, and is an enlarged cross-sectional view a state after separation membrane elements are coupled together.

Similar to the modification example of the first embodiment, the pressing portion 40 provided in the second end member 4 may be a discrete member supported by the second end member 4 as in a separation membrane module 1D shown as a modification example in FIGS. 7A and 7B. It should be understood that the other modifications described in the first embodiment are applicable to the second embodiment.

Third Embodiment

Next, a separation membrane module 1E according to a third embodiment of the present invention will be described with reference to FIGS. 8A and 8B.

In the present embodiment, the first end member 3 and the second end member 4 have approximately symmetrical shapes, and an annular sealing member 5C is mounted in a straddling manner on the first end member 3 and the second end member 4 that are adjacent to each other. Specifically, a groove extending in the circumferential direction and intended for mounting of the sealing member 5C is formed in the first end member 3 by the flange portion 34, the reduced diameter portion 35, and the projecting portion 36, while a groove extending in the circumferential direction and intended for mounting of the sealing member 5C is formed in the second end member 4 by the flange portion 44, the reduced diameter portion 45, and the projecting portion 46.

In a state (normal condition) where the sealing member 5C is merely mounted on the first end member 3 and the second end member 4, and maintains a natural shape free from any external force, the sealing member 5C has such an outer diameter that the sealing member 5C is located radially inward of the maximum diameter portions of the first end member 3 and second end member 4. That is, the outer diameter of the sealing member 5C in the natural posture is slightly smaller than the maximum diameters of the first end member 3 and the second end member 4. As shown in FIG. 8B, when the adjacent separation membrane elements 2 are coupled together and brought into contact with each other, the sealing member 5C is pressed by the first end member 3 and the second end member 4 to be expanded radially outward, and is thus pressed against the inner circumferential face 7a of the pressure container 7. That is, as in the first embodiment and the second embodiment, the sealing member 5C is deformed due to contact between the adjacent separation membrane elements 2, and comes into close contact with the inner circumferential face 7a of the pressure container 7.

Specifically, the sealing member 5C includes a first ring portion 51 having a rectangular cross-sectional shape, a second ring portion 52 having the same cross-sectional shape as that of the first ring portion 51, and a bridge portion 53 bulging radially outward and bridging the first ring portion 51 and the second ring portion 52.

The first ring portion 51 is inserted in the groove formed by the flange portion 34, the reduced diameter portion 35, and the projecting portion 36, and is thus held by the first end member 3. The second ring portion 52 is inserted in the groove formed by the flange portion 44, the reduced diameter portion 45, and the projecting portion 46, and is thus held by the second end member 4. When the adjacent separation membrane elements 2 are coupled together and brought into contact with each other, the first ring portion 51 is pressed toward one side (the upstream side) of the pressure container by the outer end face of the flange portion 34 of the first end member 3 that faces the opposite side to the outer covering material 28, while the second ring portion 52 is pressed toward the other side (the downstream side) of the pressure container by the outer end face of the flange portion 44 of the second end member 4 that faces the opposite side to the outer covering material 28.

In the axial direction of the sealing member 5C, the bridge portion 53 has a length which is sufficiently larger than the sum of the thicknesses of the projecting portion 36 and the projecting portion 46. When the adjacent separation membrane elements 2 are coupled together and brought into contact with each other, the bridge portion 53 is deformed to bulge radially outward, and the center of the bridge portion 53 is pressed against the inner circumferential face 7a of the pressure container 7.

Figure 9:
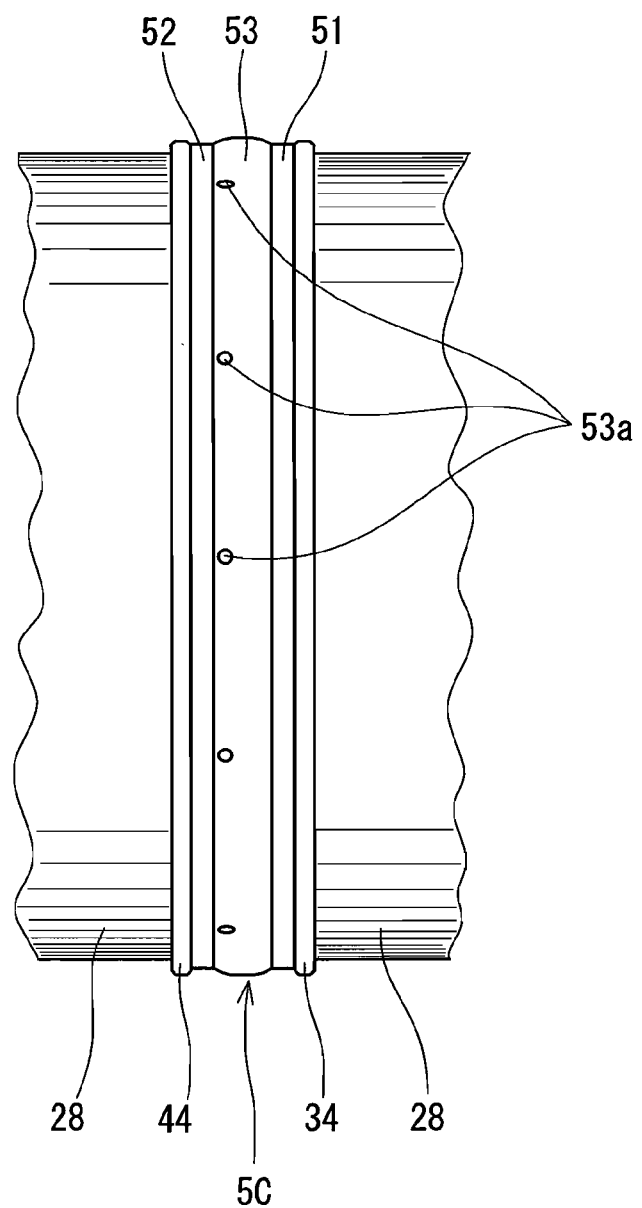
FIG. 9 is a side view showing a state where a sealing member is mounted on a first end member and a second end member of a separation membrane element.

A plurality of through holes 53a are provided in the bridge portion 53 at positions upstream from the center of the bridge portion 53, and allow the space between the separation membrane element 2 and the inner circumferential face 7a of the pressure container 7 to communicate with the flow path 20 formed between the first end member 3 and the second end member 4 to guide raw water having passed through the separation membrane element 2 to a space around the separation membrane element 2. Therefore, as in the first embodiment, the separation membrane module 1E is configured as a downstream pressure application-type separation membrane module as shown in FIG. 4A. If the thorough holes 53a are provided at positions downstream from the center of the bridge portion 53, an upstream pressure application-type separation membrane module as shown in FIG. 4B can be realized. In addition, the through holes 53a are preferably arranged on the same circumference at regular angular intervals as shown in FIG. 9.

In the case of the separation membrane module 1E of the present embodiment described above, when the separation membrane elements 2 are inserted into the pressure container 7, the insertion was carried out while the adjacent separation membrane elements 2 are kept spaced from each other at a certain distance. For example, the separation membrane element 2 on the upstream side is pushed while the separation membrane element 2 on the downstream side is concurrently pulled.

In the separation membrane module 1E of the present embodiment described above, the sealing member 5C in the normal condition is located radially inward of the maximum diameter portions of the first end member 3 and the second end member 4. Therefore, each separation membrane element 2 can easily be inserted into the pressure container 7 by sliding the first end member 3 and the second end member 4 on the inner circumferential face 7a of the pressure container 7. The sealing member 5C is deformed to seal the gap between the separation membrane element 2 and the inner circumferential face 7a of the pressure container 7 when another separation membrane element 2 is subsequently placed at a proper position.

Modification Example

Figure 8A:
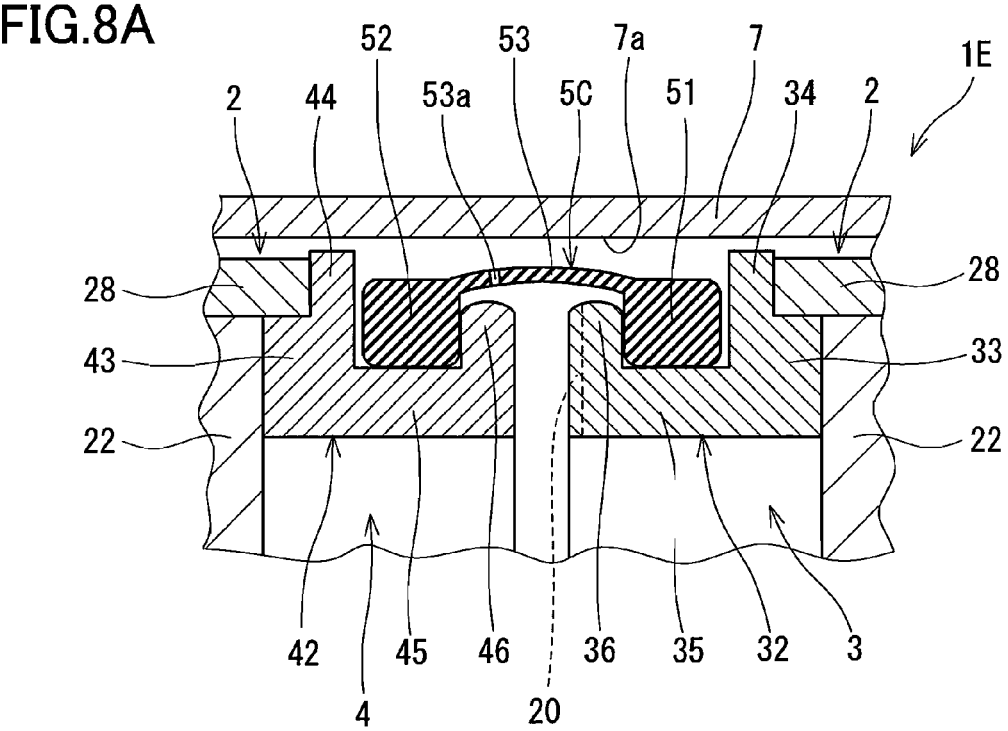
FIG. 8A is a diagram showing a separation membrane module according to a third embodiment of the present invention, and is an enlarged cross-sectional view showing a state before separation membrane elements are coupled together.
Figure 8B:
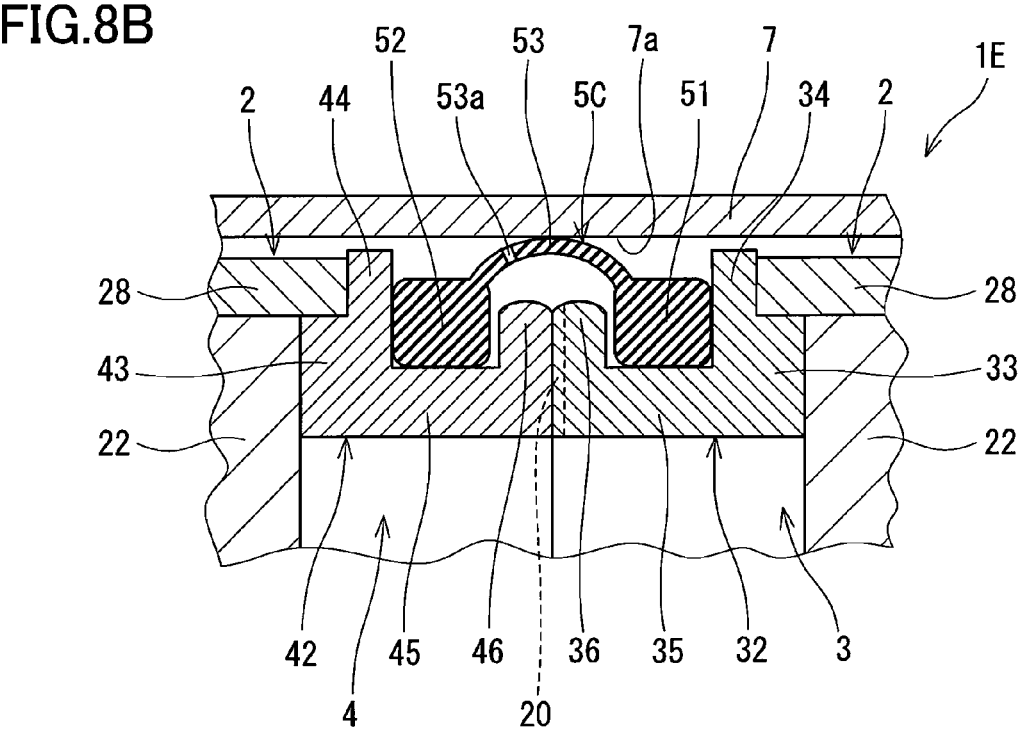
FIG. 8B is a diagram showing the separation membrane module according to the third embodiment of the present invention, and is an enlarged cross-sectional view showing a state after separation membrane elements are coupled together.
Figure 10:
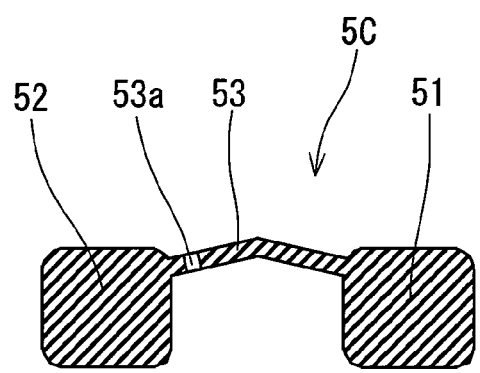
FIG. 10 is a cross-sectional view of a sealing member of a modification example.

The bridge portion 53 of the sealing member 5C may not necessarily have an arc-shaped cross-section as shown in FIGS. 8A and 8B, and may have a V-shaped cross-section as shown in FIG. 10, for example.

Fourth Embodiment

Figure 11A:
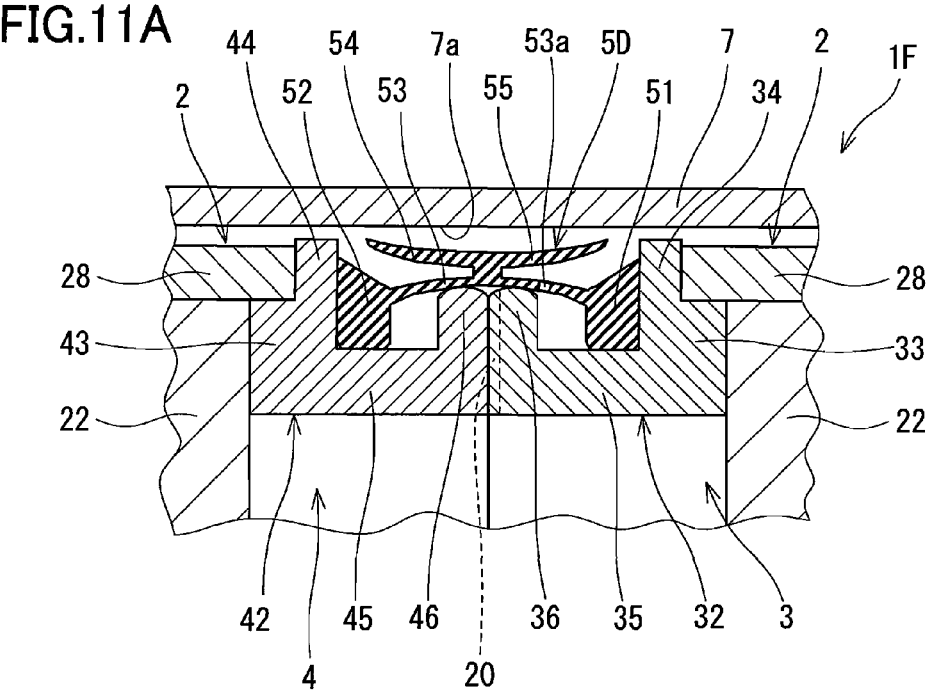
FIG. 11A is a diagram showing a separation membrane module according to a fourth embodiment of the present invention, and is an enlarged cross-sectional view showing a state before raw water is supplied into the pressure container.
Figure 11B:
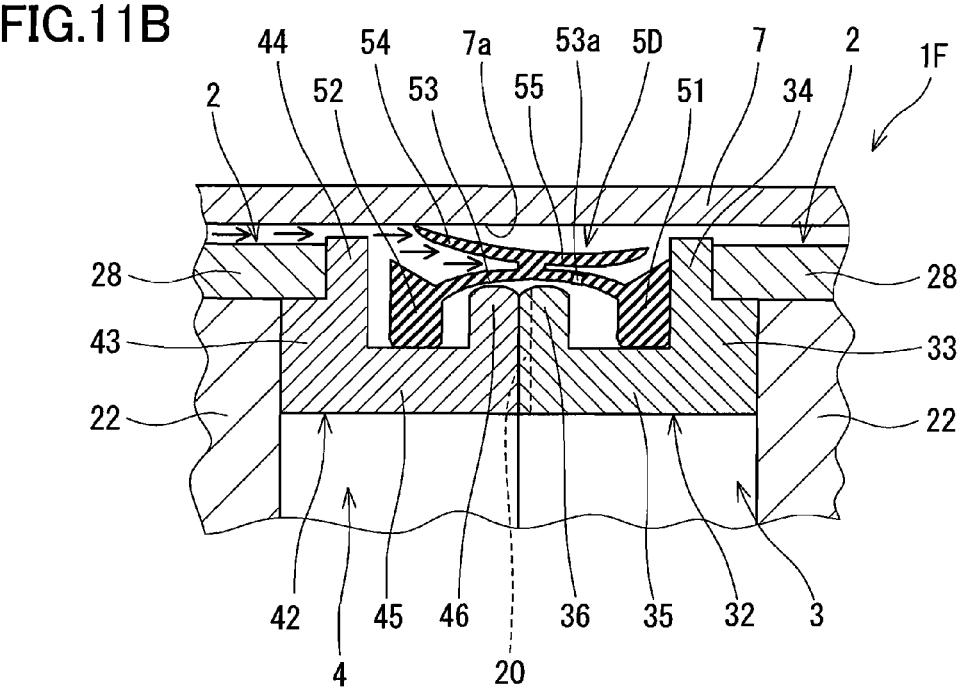
FIG. 11B is a diagram showing the separation membrane module according to the fourth embodiment of the present invention, and is an enlarged cross-sectional view showing a state after raw water is supplied into the pressure container.

Next, a separation membrane module 1F according to a fourth embodiment of the present invention will be described with reference to FIGS. 11A and 11B.

Except for the shape of a sealing member 5D, the separation membrane module 1F of the present embodiment has the same configuration as that of the separation membrane module 1E of the third embodiment. The sealing member 5D used in the present embodiment is configured to be hardly deformed merely by coupling the adjacent separation membrane elements 2 together after the sealing member 5D is mounted on the first end member 3 and the second end member 4.

In a state (normal condition) where the sealing member 5D is merely mounted on the first end member 3 and the second end member 4, and maintains a natural shape free from any external force, the sealing member 5D has such an outer diameter that the sealing member 5D is located radially inward of the maximum diameter portions of the first end member 3 and the second end member 4. That is, the outer diameter of the sealing member 5D in the natural posture is slightly smaller than the maximum diameters of the first end member 3 and the second end member 4. As shown in FIG. 11B, when the adjacent separation membrane elements 2 are coupled together, and then a pressure applied from one side of the pressure container 7 in the axial direction (the upstream side in the present embodiment) becomes higher than a pressure applied from the other side of the pressure container 7 in the axial direction (the downstream side in the present embodiment), the sealing member 5D is deformed to be expanded radially outward, and is thus pressed against the inner circumferential face 7a of the pressure container 7. That is, the sealing member 5D is deformed due to supply of raw water (a pressurized liquid) into the pressure container 7, and comes into close contact with the inner circumferential face 7a of the pressure container 7.

Specifically, the sealing member 5D includes a first ring portion 51 having a trapezoidal cross-sectional shape, a second ring portion 52 having the same cross-sectional shape as that of the first ring portion 51, and a bridge portion 53 bridging the first ring portion 51 and the second ring portion 52. The cross-sectional shapes of the first ring portion 51 and the second ring portion 52 may be rectangular as in the third embodiment.

The first ring portion 51 is inserted in a groove formed by the flange portion 34, the reduced diameter portion 35, and the projecting portion 36, and is thus held by the first end member 3. The second ring portion 52 is inserted in a groove formed by the flange portion 44, the reduced diameter portion 45, and the projecting portion 46, and is thus held by the second end member 4.

In the axial direction of the sealing member 5D, the bridge portion 53 has such a length that the natural length of the sealing member 5D is approximately equal to a distance between the flange portion 34 of the first end member 3 of one of the adjacent separation membrane elements 2 coupled together and being in contact with each other, and the flange portion 44 of the second end member 4 of the other of the adjacent separation membrane elements 2. That is, when the adjacent separation membrane elements 2 are coupled together and brought into contact with each other, the bridge portion 53 is hardly deformed. In the example shown in the drawings, the bridge portion 53 is curved in such a manner that its center bulges radially outward. However, the bridge portion 53 may have the shape of a tube extending parallel to the axial direction of the sealing member 5D.

A diameter-expanding portion 54 is provided on the outer circumferential face of the bridge portion 53, and extends toward one side (the upstream side in the present embodiment) of the pressure container 7 in the axial direction in such a manner as to gradually expand radially. In the present embodiment, a second diameter-expanding portion 55 having a shape symmetrical to that of the diameter-expanding portion 54 is provided on the outer circumferential face of the bridge portion 53 in continuity with the diameter-expanding portion 54. However, the sealing member 5D may have an approximately Y-shaped cross-section without having the second diameter-expanding portion 55.

In addition, a plurality of through holes 53a are provided in an area of the bridge portion 53 that is located on the opposite side to the direction in which the diameter-expanding portion 54 extends (the other side of the pressure container 7 in the axial direction), with respect to a position at which the diameter-expanding portion 54 connects with the bridge portion 53. The thorough holes 53a allow the space between the separation membrane element 2 and the inner circumferential face 7a of the pressure container 7 to communicate with the flow path 20 formed between the first end member 3 and the second end member 4 to guide raw water having passed through the separation membrane element 2 to a space around the separation membrane element 2. Therefore, in contrast to the first embodiment, the separation membrane module 1F is configured as an upstream pressure application-type separation membrane module as shown in FIG. 4B.

The diameter-expanding portion 54 forms an opening which is open to the upstream side between the bridge portion 53 and the diameter-expanding portion 54. As shown in FIG. 11B, when raw water flows into the opening from the upstream side, the diameter-expanding portion 54 is deformed to be expanded radially outward, and the edge of the diameter-expanding portion 54 is pressed against the inner circumferential face 7a of the pressure container 7. At the same moment when the diameter-expanding portion 54 is deformed, the second ring portion 52 is displaced to the downstream side by a pressure difference between the upstream side and the downstream side, and the bridge portion 53 is deformed to slightly bulge radially outward.

In the case of the separation membrane module 1F of the present embodiment, when the separation membrane element 2 is inserted into the pressure container 7, the separation membrane element 2 can be pushed into the pressure container 7 from one side (the upstream side or the downstream side) of the pressure container 7 in the axial direction.

In the separation membrane module 1F of the present embodiment described above, the sealing member 5D in the normal condition is located radially inward of the maximum diameter portions of the first end member 3 and the second end member 4. Therefore, each separation membrane element 2 can easily be inserted into the pressure container 7 by sliding the first end member 3 and the second end member 4 on the inner circumferential face 7a of the pressure container 7. When all of the separation membrane elements 2 are placed at proper positions, and raw water is supplied into the pressure container 7, the sealing members 5D are deformed to seal the gaps between the separation membrane elements 2 and the inner circumferential face 7a of the pressure container 7.

Modification Example

In the case where the separation membrane element 2 is inserted in the pressure container 7 in such an orientation that the first end member 3 is located on the downstream side, and the second end member 4 is located on the upstream side, the diameter-expanding portion 54 forms an opening which is open to the downstream side between the bridge portion 53 and the diameter-expanding portion 54, and the through holes 53a are located on the opposite side to the opening. In this case, a downstream pressure application-type separation membrane module as shown in FIG. 4A can be realized.

DESCRIPTION OF THE REFERENCE NUMERALS 1A to 1F Separation membrane module
2 Separation membrane element
20 Flow path
21 Central pipe
22 Separation membrane
3 First end member
4 Second end member
40 Pressing portion
40a Through hole
5A to 5D Sealing member
51 First ring portion
52 Second ring portion
53 Bridge portion
53a Through hole
54 Diameter-expanding portion
7 Pressure container
7a Inner circumferential face

The invention claimed is:

1. A separation membrane module comprising:
a tubular pressure container;
a plurality of separation membrane elements each having a separation membrane, and a first end member and a second end member that are disposed so as to sandwich the separation membrane, the plurality of separation membrane elements being inserted in the pressure container in such a manner that the first end members and the second end members are alternately arranged in an axial direction of the pressure container; and
a sealing member being annular and mounted on one of or both the first end member and the second end member that are adjacent to each other, the sealing member in a normal condition being located radially inward of a maximum diameter portion of the first end member and/or the second end member on which the sealing member is mounted,
wherein the sealing member is deformed due to contact between the separation membrane elements adjacent to each other or due to supply of a pressurized liquid into the pressure container, and thus comes into close contact with an inner circumferential face of the pressure container.

2. The separation membrane module according to claim 1, wherein
the sealing member is mounted on any of the first end members that are adjacent to the second end members, and
a pressing portion is provided in any of the second end members that are adjacent to the first end members, and when the adjacent separation membrane elements come into contact with each other, the pressing portion presses the sealing member to deform the sealing member, and thus to press the sealing member against the inner circumferential face of the pressure container.

3. The separation membrane module according to claim 2, wherein the pressing portion is a projecting portion formed integrally in the second end member.

4. The separation membrane module according to claim 2, wherein the pressing portion is a discrete member supported by the second end member.

5. The separation membrane module according to claim 2, wherein
a flow path that guides raw water having passed through the separation membrane element to a space around the separation membrane element is formed between the first end member and the second end member, and
the pressing portion is provided with a communication path that allows a space between the separation membrane element and the inner circumferential face of the pressure container to communicate with the flow path.

6. The separation membrane module according to claim 1, wherein the sealing member is mounted in a straddling manner on the first end member and the second end member that are adjacent to each other, and the sealing member is configured so that when the adjacent separation membrane elements come into contact with each other, the sealing member is pressed by the first end member and the second end member to be expanded radially outward, and is thus pressed against the inner circumferential face of the pressure container.

7. The separation membrane module according to claim 6, wherein the sealing member comprises a first ring portion held by the first end member, a second ring portion held by the second end member, and a bridge portion bulging radially outward and bridging the first ring portion and the second ring portion.

8. The separation membrane module according to claim 7, wherein
a flow path that guides raw water having passed through the separation membrane element to a space around the separation membrane element is formed between the first end member and the second end member, and
the bridge portion of the sealing member is provided with a through hole that allows a space between the separation membrane element and the inner circumferential face of the pressure container to communicate with the flow path.

9. The separation membrane module according to claim 1, wherein the sealing member is mounted in a straddling manner on the first end member and the second end member that are adjacent to each other, and the sealing member is configured so that when a pressure applied from one side of the pressure container in the axial direction becomes higher than a pressure applied from the other side of the pressure container in the axial direction, the sealing member is deformed to be expanded radially outward, and is thus pressed against the inner circumferential face of the pressure container, a flow path that guides raw water having passed through the separation membrane element to a space around the separation membrane element is formed between the first end member and the second end member, and the sealing member is provided with a through hole that allows a space between the separation membrane element and the inner circumferential face of the pressure container to communicate with the flow path.

10. The separation membrane module according to claim 9, wherein the sealing member comprises: a first ring portion held by the first end member; a second ring portion held by the second end member; a bridge portion bridging the first ring portion and the second ring portion; and a diameter-expanding portion provided on an outer circumferential face of the bridge portion, and extending toward one side of the pressure container in the axial direction in such a manner as to gradually expand radially, and the through hole is formed in an area of the bridge portion that is located on the other side of the pressure container in the axial direction with respect to a position at which the diameter-expanding portion connects with the bridge portion.

* * * * *

UNITED STATES PATENT AND TRADEMARK OFFICE
CERTIFICATE OF CORRECTION

PATENT NO.        : 9,061,247 B2                                            Page 1 of 1
APPLICATION NO.   : 13/877030
DATED             : June 23, 2015
INVENTOR(S)       : Chikura et al.

It is certified that error appears in the above-identified patent and that said Letters Patent is hereby corrected as shown below:

On the title page item 75 in column 1, in "Inventors", line 3: delete "Osako (JP);" and insert
--Osaka (JP);--.

In the specification

Column 10, line 59: delete "thorough" and insert --through--.

Column 12, line 47: delete "thorough" and insert --through--.

Signed and Sealed this
Twelfth Day of January, 2016

Michelle K. Lee
*Director of the United States Patent and Trademark Office*